United States Patent
Hannure et al.

(10) Patent No.: US 11,991,248 B1
(45) Date of Patent: May 21, 2024

(54) SYSTEM AND METHOD FOR DATA CONTINUITY IN AN AGRICULTURAL SYSTEM

(71) Applicant: DEERE & COMPANY, Moline, IL (US)

(72) Inventors: Mahmad Sadique S. Hannure, Pune (IN); Sohail Abdul Qaiyum Shaikh, Akola (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/053,797

(22) Filed: Nov. 9, 2022

(51) Int. Cl.
*H04L 67/125* (2022.01)
*H04L 67/1095* (2022.01)

(52) U.S. Cl.
CPC ........ *H04L 67/125* (2013.01); *H04L 67/1095* (2013.01)

(58) Field of Classification Search
CPC .......................... H04L 67/125; H04L 67/1095
See application file for complete search history.

(56) References Cited

U.S. PATENT DOCUMENTS

| | | | |
|---|---|---|---|
| 8,498,788 B2 | 7/2013 | Kondekar | |
| 8,738,238 B2 | 5/2014 | Rekow | |
| 10,254,765 B2 | 4/2019 | Rekow | |
| 2006/0248009 A1* | 11/2006 | Hicks | G06Q 20/40 705/40 |
| 2009/0144629 A1* | 6/2009 | Ferlitsch | H04N 1/00503 715/736 |
| 2010/0042297 A1* | 2/2010 | Foster | H04L 63/08 701/50 |
| 2015/0312242 A1* | 10/2015 | Ogawa | G06F 16/955 726/6 |
| 2018/0201132 A1* | 7/2018 | Cherney | B60T 7/16 |
| 2019/0258807 A1* | 8/2019 | DiMaggio | G06F 21/577 |
| 2020/0259852 A1* | 8/2020 | Wolff | G06N 7/01 |
| 2020/0337223 A1* | 10/2020 | Snipes | A01C 7/105 |

\* cited by examiner

*Primary Examiner* — Javier O Guzman
(74) *Attorney, Agent, or Firm* — Hanley, Flight & Zimmerman, LLC

(57) ABSTRACT

An agricultural system, comprising: an agricultural machine having a communication network; a continuity identification system configured to generate continuity data, the continuity data relating to an operator and a mobile device on the communication network of the agricultural machine; and a control signal that generates a control signal based on the continuity data, the control signal configured to automatically logout the operator from an application on the mobile device when the mobile device is no longer connected to the communication network.

20 Claims, 11 Drawing Sheets

SYSTEM AND METHOD FOR DATA CONTINUITY IN AN AGRICULTURAL SYSTEM

FIELD OF THE DESCRIPTION

The present description relates to ensuring data continuity in an agricultural system and, more particularly, to ensuring data continuity using a mobile device over one or more cellular and wireless networks in an agricultural system.

BACKGROUND

Current communication networks and conventional devices on agricultural machines are unable to adequately support agricultural operations involving mobile and static nodes. For example, current communication networks on agricultural machines are unable to adequately support a network comprising a complex array of mobile devices and mobile applications used by multiple operators across numerous communication networks. Limitations and disadvantages of conventional methods and systems will become apparent to one of skill in the art, through comparison of such approaches with some aspects of the present methods and systems set forth in the remainder of this disclosure with reference to the drawings.

SUMMARY

An agricultural system, comprising: an agricultural machine having a communication network; a continuity identification system configured to generate continuity data, the continuity data relating to an operator and a mobile device on the communication network of the agricultural machine; and a control signal that generates a control signal based on the continuity data, the control signal configured to automatically logout the operator from an application on the mobile device when the mobile device is no longer connected to the communication network.

A method of controlling an agricultural system, the method comprising: providing an agricultural machine having a communication network; associating an operator and a mobile device on the communication network of the agricultural machine; sensing the connection of the mobile device to the communication network; and generating a control signal to automatically logout the operator from an application on the mobile device when the mobile device is no connected to the communication network.

An agricultural system, comprising: a communication system configured to receive a first set of continuity information from a first agricultural machine and a second set of continuity information from a second agricultural machine; a continuity information processing system that generates a first continuity data record identifying a first continuity corresponding to the first set of continuity information and that generates a second continuity data record identifying a second continuity corresponding to the second set of continuity information; and a continuity database generation system that generates a continuity database that includes the first continuity data record and the second continuity data record, the communication system sending the continuity database to the first agricultural machine and the second agricultural machine.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
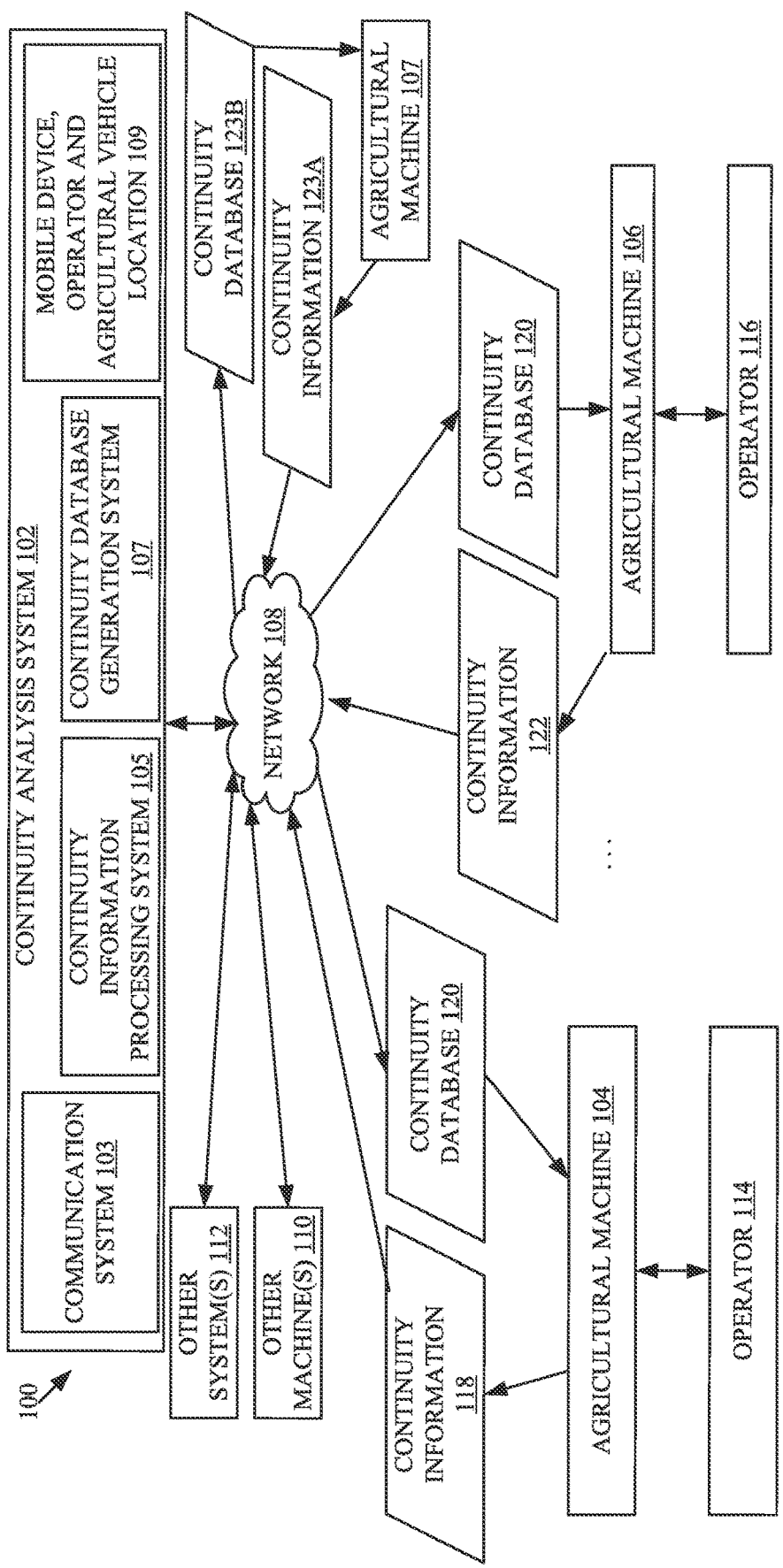
FIG. 1 is a block diagram of one example of an agricultural system.

With the advent of mechanization and automation technologies, significant portions of certain agricultural operations like planting, cultivating, spraying and harvesting are now routinely performed by an automated systems and make extensive use of mobile devices and applications. These technologies allow for an operator to maximize his or her time and, ultimately, crop yields. Additionally, agricultural equipment, such as tractors and planters, include computer systems and controllers capable of permitting farmers and farming business to exercise extremely precise control over almost every aspect of a farming operation, such as fertilizing, planting, spraying or harvesting crops in a field. These technologies allow for an operator to maximize his or her time and, ultimately, crop yields. An example of automated steering system is the John Deere AutoTrac™ system. Additionally, exemplary automated steering systems are further disclosed in the following patents, each of which are incorporated by reference in their entirety: U.S. Pat. Nos. 8,498,788, 8,738,238, and U.S. Pat. No. 10,254,765.

In a technique known as precision farming, the computer systems and related technology available today permits farming businesses to program the farming equipment to carry out farming operations almost entirely under automated control of software programs that can automatically activate and deactivate the machines, and even particular sections, row units, nozzles or blades on the implement at precisely the right time and place in order to optimize inputs such as seed, pesticide and fertilizer, and thereby achieve greater yields.

During the course of performing farming operations, the computer systems and technology onboard the farming vehicles and farming implements typically transmit, receive and respond to electronic messages containing an enormous amount of very detailed operational data that describes almost every aspect of the farming operation. For example, if the farming vehicle and the farming implement used during a farming operation are a tractor and a planter, then the tractor and the planter will use the onboard computer systems and computer network to exchange and respond to a large number of messages that include operating parameters for the planter, such as seeding rate, hydraulic downforce, planting speed, row spacing, etc. It is extremely useful to capture, store, analyze and share these operating parameters. A farmer could use and share this information, for example, to determine and compare this planting data with the plant health and or yield Some agricultural equipment are now equipped with sophisticated monitors (John Deere Gen 4), communications platforms telematics gateways (John Deere MTG) and wireless data servers (John Deere WDS). Additionally, a user may interact with their agricultural machinery in a variety of ways including through mobile applications (John Deere ConnectMobile) on a mobile device. For example, John Deere provides Connect Mobile hardware factory installed on many newer planters, sprayers, harvester, and tractors. Further, on certain newer sprayers, John Deere provides 4600 CommandCenter™ (with Connect Mobile server app) which eliminates the need for a wireless data server. Where ConnectMobile hardware is provided, farmers do not need any additional equipment and may simply pair the Wi-Fi of a mobile device to a wireless network (e.g., such as that provided by the John Deere 4640 Universal Display). For harvesters, Connect Mobile hardware is factory installed and, with the John Deere modular telematics gateway (MTG), farmers can bring any mobile device (phone or table) to the cab and go.

FIG. 1 is a block diagram of one example of an agricultural system 100. System 100 includes a continuity (also interchangeably referred to as a discontinuity or fault) analysis system 102 that can be accessed by a plurality of different agricultural machines 104-106 over network 108. Continuity analysis system 102 and agricultural machines 104-106 may also be in communication with other machines 110 and other systems 112 over network 108. Agricultural machines 104-106 may be any type of agricultural machines, such as tillage machines, harvesters, seeders or planters, or other agricultural machines. Network 108 may be a wide area network, a local area network, a near field communication network, a cellular communication network, or any other of a wide variety of networks or combinations of networks. FIG. 1 also shows that agricultural machine 104 may be operated by operator 114 and agricultural machine 106 may be operated by operator 116. In one example, where a continuity/fault issue is detected (e.g., incorrect machine location and mobile device pairing, failure of operator log off of mobile application before exiting agricultural machine), operator 114 may provide an input to agricultural machine 104 to send continuity information 118 over network 108 to continuity analysis system 102. In another example, agricultural machine 107 may itself automatically determine that continuity issue is occurring and send continuity information 123A to continuity analysis system 102.

The continuity information 118,122,123A is received by communication system 103 at continuity analysis system 102. Continuity information processing system 105 analyzes the continuity information 118 to identify the core reason for the continuity issue. Continuity information processing system 105 can include automated continuity analysis functionality as well as manual resources. Continuity information processing system 105 at continuity analysis system 102 may also identify mitigation control steps that can be executed on agricultural machine 104 in order to mitigate or address the continuity issue that is occurring at agricultural machine 104. The mitigation control steps are then sent back to agricultural machine 104. In addition, continuity analysis system 102 may include a continuity database generation system 107 which can update a continuity database 120 that stores records of continuity issues, the signatures or other information that identifies those continuity issues, and mitigation control steps that can be used to address the continuity issues.

The continuity information can be received from the different agricultural machines 104-106 so that the continuity database 120 generated by continuity analysis system 102 may be updated locally or on the Cloud based on continuity issues reported by all of the different agricultural machines 104-106. The updated continuity database 120 may then be downloaded to or accessed by the agricultural machine 104 where a continuity identification system can scan the continuity database 120 and compare it against logged data, sensor inputs, or other information on agricultural machine 104 to determine when a fault is occurring. The agricultural machine 104 can then automatically execute the corresponding mitigation control steps to mitigate the fault, or agricultural machine 104 may surface the mitigation control steps on an operator interface mechanism for operator 114, instructing operator 114 how to perform the mitigation control steps.

FIG. 1 also shows that agricultural machine 106 can send continuity information 122 through network 108 to continuity analysis system 102. Continuity analysis system 102 can identify the fault occurring on machine 116, the signature or other data that indicates that the fault is present, and mitigation control steps that can be used to mitigate the fault and update the continuity database 120 accordingly. The updated continuity database 120 can then be downloaded to or accessed by the agricultural machine 106 and to agricultural machine 104. In this way, each of the agricultural machines 104-106—each of which may be associated with multiple operators 114 and mobile devices 146—can benefit from resolution of continuity issues with other agricultural machines 104-106 that have been addressed by continuity analysis system 102. Thus, when the updated continuity database 120 is downloaded to or accessed by agricultural machines 104-106, the faults may be recognized and mitigated even though it is the first time that the particular fault has occurred on the particular agricultural machine.

Figure 2:
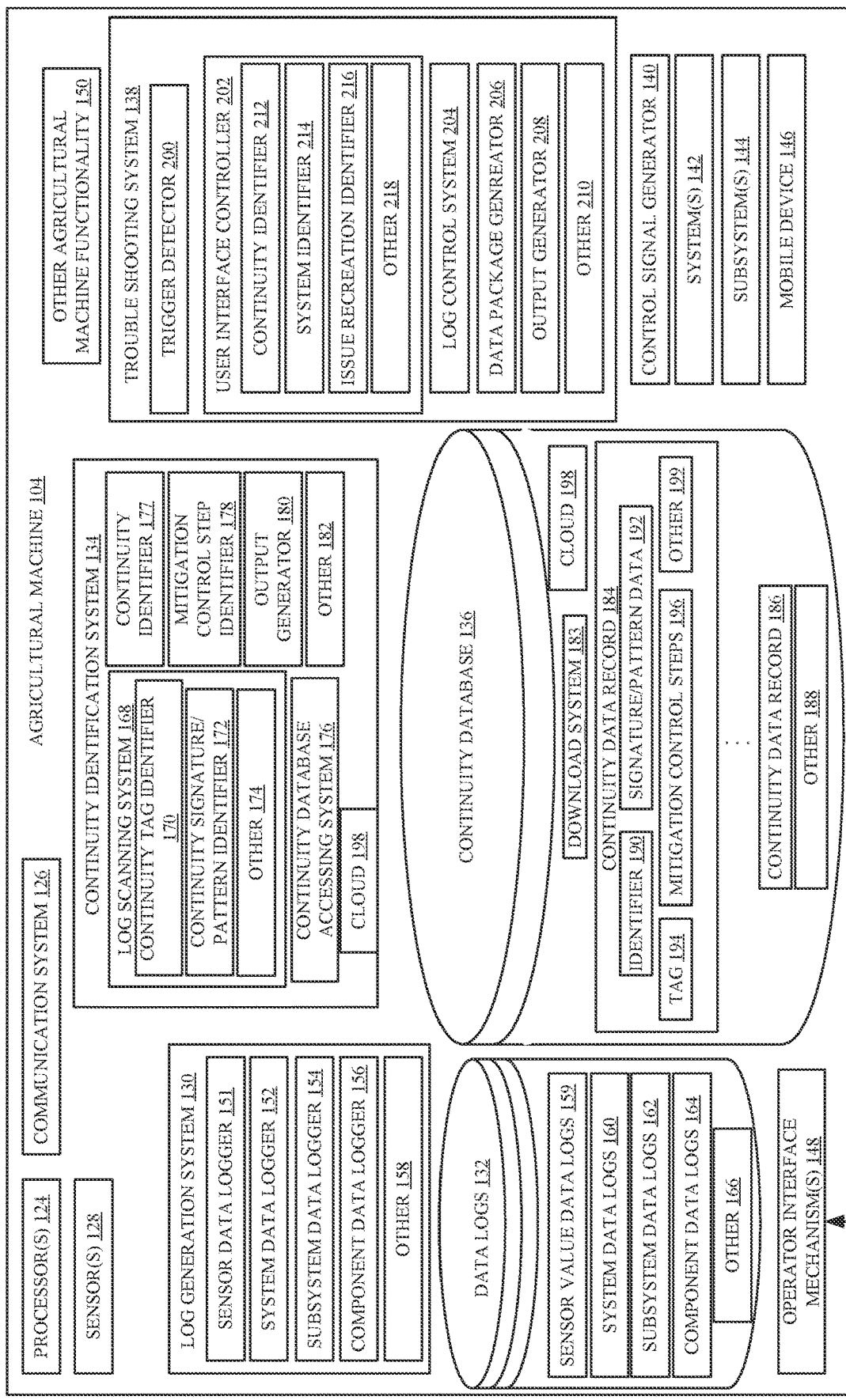
FIG. 2 is a block diagram showing one example of an agricultural harvester.

FIG. 2 is a block diagram showing one example of agricultural machine 104 in more detail. In the example shown in FIG. 2, agricultural machine 104 includes one or more processors 124, communication system 126, one or more sensors 128, log generation system 130, data logs 132, continuity identification system 134, continuity database 136, troubleshooting system 138, control signal generator 140, systems 142, subsystems 144, mobile device (other component) 146, user interface mechanisms 148 and other agricultural machine functionality 150. Log generation system 130 includes sensor data logger 151, system data logger 152, subsystem data logger 154, component data logger 156, and other items 158. Data logs 132 include sensor value data logs 159, system data logs 160, subsystem data logs 162, component data logs 164, and other items 166. Continuity identification system 134 illustratively includes log scanning system 168, which, itself, includes continuity tag identifier 170, continuity signature/pattern identifier 172, and other items 174. Continuity identification system 134 also illustratively includes continuity database accessing system 176, continuity identifier 177, mitigation control step identifier 178, output generator 180, and other items 182. Continuity database 136 includes Cloud access 198 or download system 183, continuity data records 184-186, and other items 188.

Each continuity data record 184-186 may include continuity identifier 190, signature/pattern data 192, tag 194, mitigation control steps 196, and other items 198. Troubleshooting system 138 can include trigger detector 200, user interface controller 202, log control system 204, data package generator 206, output generator 208, and other items 210. User interface controller 202, can, itself, include continuity identifier 212, symptom identifier 214, issue recreation identifier 216, and other items 218. Before describing the overall operation of agricultural machine 104, a brief description of some of the items in agricultural machine 104, and their operation, will first be provided.

Processors 124 may include one or more central processing units with associated random access memory (RAM), timing circuitry and other logic or memory. Communication system 126 facilitates communication among the various items on agricultural machine 104 and communication over network 108. Therefore, communication system 126 can be a controller area network—CAN—bus controller and CAN bus. Communication system 126 may be any of a wide variety of different types of systems (e.g., cellular or WIFI) depending upon the particular communication that it is to enable. For instance, if network 108 includes a cellular communication network, then communication system 126 will include a cellular communication system so that communication system 126 can communicate over network 108. This is just one example and communication system 126 can include one or more different or additional communication systems as well.

Sensors 128 may include a wide variety of different types of sensors, depending upon the type of agricultural machine 104 the sensors 128 are disposed on. For example, when mapping the location of a mobile device 146 and/or operator relative to the live location of an agricultural machine, the sensors 128 may comprise a network formed by machine hardware such as on-board control units, monitors (e.g., John Deere Gen4), wireless and Bluetooth communication networks (John Deere WDS), telematic solutions (e.g., John Deere MTG), etc. Additional sensors 128 may include those on mobile device 146 such as accelerometers, gyroscopes, pedometers, magnetometers, and barometers. In another example, sensor 128 may sense one or more of the performance of agricultural machine 104, environmental conditions in the environment of agricultural machine 104, crop conditions or crop properties, soil conditions or soil properties, the operation of processors 124, the operation of communication system 126, operation of on board control units, and other sensors 128, or a wide variety of other sensors.

Generally, then, sensors 128 help to establish continuity and mapping of the respective locations of the operator 114 and mobile device 146 relative to the agricultural machine to ensure consistent live location data of at least the agricultural machine but also combinations thereof. Thus, when an operator 114 fails to logout from a mobile application on their mobile device 146, the location of the mobile device relative to the agricultural machine and the operator will stop synchronizing and/or be adjusted such that continuity is restored and correct data representative of the live location of the agricultural machine is logged.

Log generation system 130 logs information from one or more of sensors 128, systems 142, subsystems 144, and mobile device 146. The data can be logged along with a time that the data was captured, the location of agricultural machine 104 when the data was captured, and any of a wide variety of other information.

Log generation system 130 can log the data periodically or otherwise intermittently. The rate at which the data is logged may be constant or variable so the rate can be increased or decreased. In addition, each of the different data loggers 151-158 may be separately controlled to increase the amount or extent of data logged from certain areas of agricultural machine 104 under different circumstances. By way of example, assume that a mobile device 146 typically way of associated with an operator 114 is suspected of not being within the cab or general proximity of an agricultural machine. In that case, component data logger 156 may increase the frequency with which it captures data regarding the operation of mobile device 146 or the amount of different data or data types captured.

Sensor data logger 151 captures and logs the sensor signals or values sensed by sensors 128. System data logger 152 captures data generated by or sensed from systems 142. Subsystem data logger 154 logs data captured from or sensed from subsystems 144 and component data logger 156 captures data generated by or sensed from mobile device 146. Log generation system 130 generates an output indicative of the data captured by data loggers 151-158 and stores that data in data logs 132. The sensor data can be stored as sensor value data logs 159. The system data can be stored as system data logs 160. The subsystem data can be stored as subsystem data logs 162, and the component data can be stored as component data logs 164. Also, each log entry may include combinations of data. For instance, a log entry in data log 132 for a particular time period may include the sensor data values, system data, subsystem data, and component data captured during that time period. The log entries can include data that is combined in other ways as well.

Continuity identification system 134 scans the data logs 132 and accesses continuity database 136 to determine whether any faults or issues are occurring with one ore more of an agricultural machine 104, operator 114 and/or mobile device 146. For example, log scanning system 168 can scan the data logs 132 for information that has been logged by log generation system 130. Continuity database accessing system 176 can access the continuity data records 184-186 in continuity database 136. Continuity identifier 177 can compare the information extracted from data logs 132 by log scanning system 168 to the signature/pattern data 192 or continuity tags 194 in the continuity data records 184-186 to identify any faults that are occurring with one or more off an agricultural machine 104, operator 114 and/or mobile device 14. In log scanning system 168 continuity tag identifier 170 identifies any continuity tags in the data logs 132 and provides the tags to continuity identifier 177 that compares the tags against continuity tags 194 in continuity database 136. Continuity signature/pattern identifier 172 identifies any continuity signatures or data patterns in the data logs 132 and provides the signature or patterns to continuity identifier 177 that compares them against the signature/ pattern data 192 in the continuity data records 184-186. If a tag or signature data pattern matches a continuity data record 184-186, then continuity identifier 177 generates an output indicating that the continuity/fault represented by the matching continuity data record has occurred.

If continuity identifier 177 generates an output indicating that a continuity/fault has been identified, then mitigation control step identifier 178 identifies the corresponding mitigation control steps 196 in the matched continuity record 184 corresponding to the identified continuity. Output generator 180 generates an output to control signal generator 140 to perform the mitigation control steps. For instance, control signal generator 140 can control operator interface mechanisms 148 to output the recommended mitigation control steps to operator 114 so that operator 114 can manually perform the mitigation control steps. In another example, where the mitigation control steps may be automatically performed, control signal generator 140 can generate control signals to control the systems 142, subsystems 144 and mobile device 146, on agricultural machine 104, in order to execute the mitigation control steps. Control signal generator 140 can also generate control signals to recommend some mitigation control steps to operator 114 for manual execution while also generating control signals to automatically perform other mitigation control steps.

Troubleshooting system 138 is used to interact with continuity analysis system 102 (shown in FIG. 1) when a continuity/fault is either triggered by an operator input from operator 114 (such as when an operator observes incorrect live location of agricultural machine 104 or another type of symptom indicating a continuity/fault associated with agricultural machine 104), or when a continuity/fault is detected by continuity identification system 134 (such as when continuity tag identifier 170 identifies a continuity tag in data logs 132 indicating that a fault has occurred), but where a continuity data record does not exist in continuity database 136 for the identified fault. Trigger detector 200 detects either the operator input or automated trigger to activate troubleshooting system 138.

User interface controller 202 can control operator interface mechanisms 148 to prompt operator 114 for certain information that will enhance the information provided for troubleshooting. For example, continuity identifier 212 will generate a user input mechanism allowing operator 114 to identify when a continuity/fault is occurring such as incorrect live location of agricultural machine 104. Symptom identifier 214 generates an input mechanism on operator interface mechanisms 148 where operator 114 can input information to further define symptoms of continuity/fault. Issue recreation identifier 216 generates an input mechanism on operator interface mechanisms 148 that allows operator 114 to indicate when the fault has occurred or has been recreated with respect to the live location agricultural machine 104.

Log control system 204 can control log generation system 130 to increase the frequency with which data samples are logged. Log control system 204 can also control the individual data loggers 151-156 to control certain ones of them to log more data than others, based on whether the problem is identified as a sensor problem, a system problem, a subsystem problem, or a component problem. Log control system 204 can also control log scanning system 168 to increase the frequency with which the data logs 160-164 are scanned for continuity tags and continuity signatures or data patterns.

Data package generator 206 illustratively generates a data package containing the relevant log data from data logs 132 and output generator 208 controls communication system 126 to output the continuity data package as continuity information 118 to continuity analysis system 102.

Figure 3:
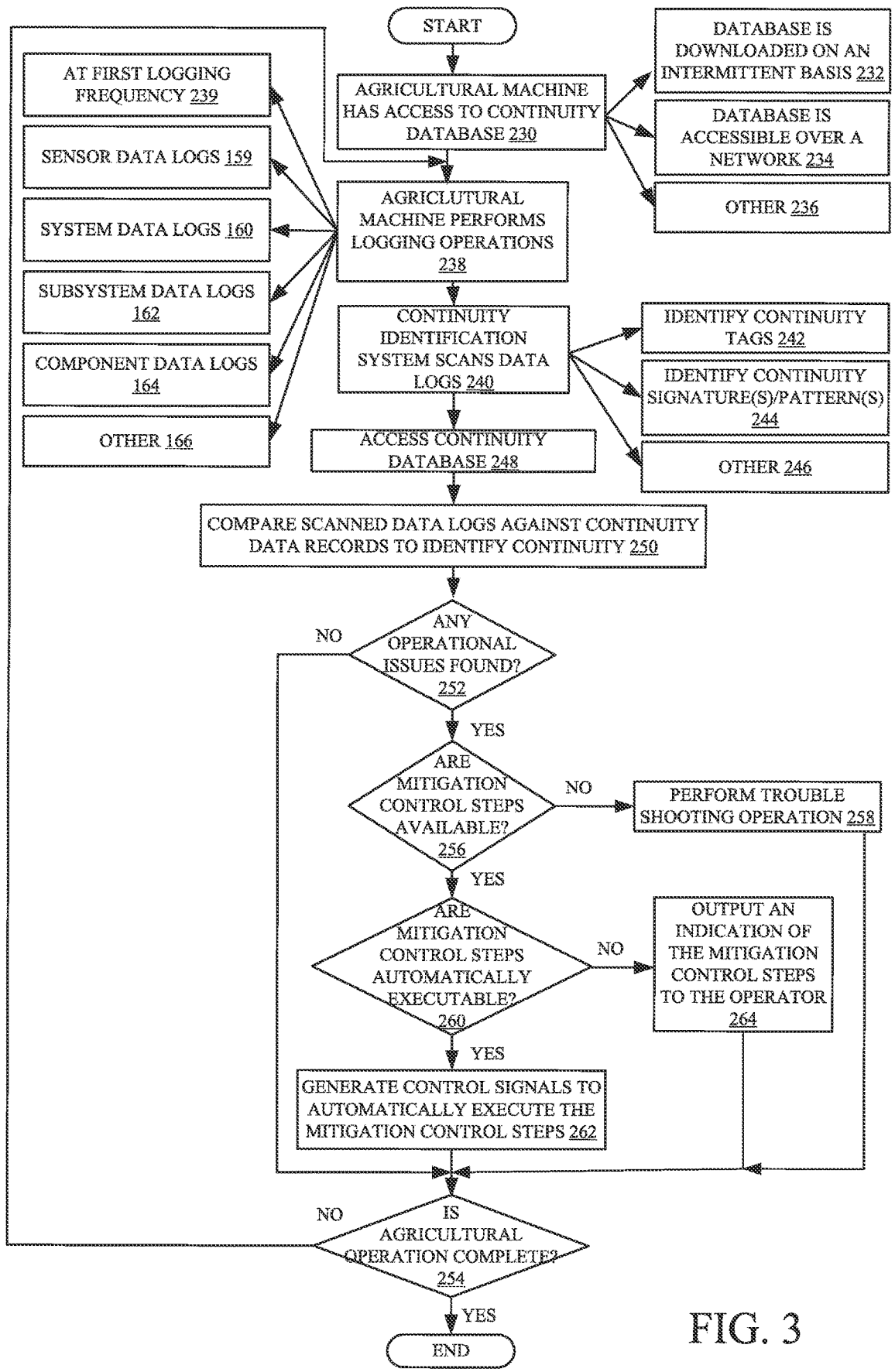
FIG. 3 is a flow diagram illustrating one example of the operation of an agricultural harvester in identifying and synchronizing device location using a location continuity database.

FIG. 3 is a flow diagram illustrating one example of the operation of agricultural machine 104 in identifying continuity/faults during runtime operation. It is first assumed that agricultural machine 104 has access to continuity database 136, as indicated by block 230 in the flow diagram of FIG. 3. In one example, download system 183 downloads continuity database 136 from continuity analysis system 102, intermittently, over network 108, as indicated by block 232. In another example, agricultural machine 104 may have access to continuity database 136 via Cloud 198 including over network 108, or another network, as indicated by block 234, without downloading continuity database 136. Agricultural machine 104 may have access to the continuity database 136 in other ways as well, as indicated by block 236.

During operation, log generation system 130 performs logging operations logging data from the various sensors 128, systems 142, subsystems 144 and mobile device 146. Performing logging operations is indicated by block 238. The logging operations during normal agricultural machine operation may be performed at a first frequency as indicated by block 240. Sensor data logger 151 generates the sensor data logs 159. System data logger 152 generates system data logs 160. Subsystem data logger 154 generates subsystem data logs 162, and component data logger 156 generates component data logs 164. Other logs 166 can be generated as well. For example, the values in the logs 159-166 may be operational characteristic values or locations of one or more of the agricultural machine 104, operator 114 and/or mobile device 146.

Also, during the operation of agricultural machine 104, log scanning system 168 scans the data logs 132 to obtain data from the logs 132 for further processing by continuity identification system 134 to identify other issues, such as continuity/fault with the location of one or more of the agricultural machine 104, operator 114 and/or mobile device 146. Scanning the data logs is indicated by block 240 in the flow diagram of FIG. 3. Block 242 shows that continuity tag identifier 170 may identify and access continuity tags that are generated by log generation system 130. Block 244 indicates that continuity signature/pattern identifier 172 identifies and accesses continuity signatures or data patterns in the data logs 132. Other scanning systems can scan data logs 132 for other items as well, as indicated by block 246.

Continuity database accessing system 176 then accesses the continuity data records 184-186 in continuity database 136, and continuity identifier 177 compares the data scanned from data logs 132 against the data in continuity data records 184-186 to identify whether any continuity/faults have occurred or are occurring with one or more of the agricultural machine 104, operator 114 and/or mobile device 146. Accessing the continuity database 136 is indicated by block 248 in the flow diagram of FIG. 3 and comparing the scanned data logs 132 against the continuity data records to identify continuity/faults is identified by block 250.

For example, it may be that some sensor data from a sensor 128 or other data already has a continuity tag applied, such as where a sensor reading is below a threshold, where a location metric is outside of a specified range, etc. In that case, the continuity tag in the data log 132 may be compared against the tags 194 in the continuity data records 184 to identify the particular continuity/fault that the tag represents. In another example, continuity signature/pattern identifier 172 can obtain signatures or data patterns from the data logs 132 and provide those signatures or patterns to continuity identifier 177 so continuity identifier 177 can compare those signatures or data patterns against the signature/pattern data 192 in the continuity data records 184-186 to determine whether a continuity data record 184-186 matches the signature or data pattern obtained from the data logs 132.

If no matching continuity data records 184-186 are found, then this means that no continuity/fault has been identified by continuity identification system 134. If no (continuity/faults) are found, as indicated by block 252, then processing reverts to block 238 where agricultural machinery 104 continues to generate data logs 132 and scan them for errors.

However, if, at block 252, a matching continuity data record (e.g., continuity data record 184) is found, then this means that a continuity/fault is occurring or has occurred with one or more of the agricultural machine 104, operator 114 and/or mobile device 146. If a fault is found, mitigation control step identifier 178 accesses the matching continuity data record 184 to obtain the mitigation control steps 196 that will mitigate or remedy the fault corresponding to the matched continuity data record 184. Determining whether any mitigation control steps are available is indicated by block 256. If not, then mitigation control step identifier 178 provides an output to output generator 180 indicating that no mitigation control steps 196 are available for this fault. Output generator 180 can generate an output to control signal generator 140 which controls troubleshooting system 138 to initiate a troubleshooting operation, as indicated by block 258, and as is described in greater detail below with respect to FIG. 4.

However, if, at block 256, it is determined that mitigation control steps 196 are available for the identified continuity/fault, then mitigation control step identifier 178 determines whether the mitigation control steps can be taken automatically or whether the mitigation control steps need manual intervention, as indicated by block 260. If the mitigation control steps 196 can be automatically executed, then output generator 180 generates an output indicating this to control signal generator 140 which generates control signals to execute the mitigation control steps. Generating control signals to automatically execute the mitigation control steps is indicated by block 262 in the flow diagram of FIG. 3. If the mitigation control steps 196 are not automatically executable, then output generator 180 generates an output to control signal generator 140 so control signal generator 140 controls operator interface mechanisms 148 to output an indication (e.g., a recommendation, a list, etc.) of the mitigation control steps to operator 114, as indicated by block 264. Operator 113 can then manually execute some or all of the mitigation control steps. Feedback can also be provided to continuity analysis system 102 indicating the detected continuity/fault and whether the mitigation control steps mitigated the continuity/fault (as indicated automatically or based on an operator input). The feedback can be used for machine learning or other learning systems to improve the accuracy and coverage of continuity database 136.

Figure 4A:
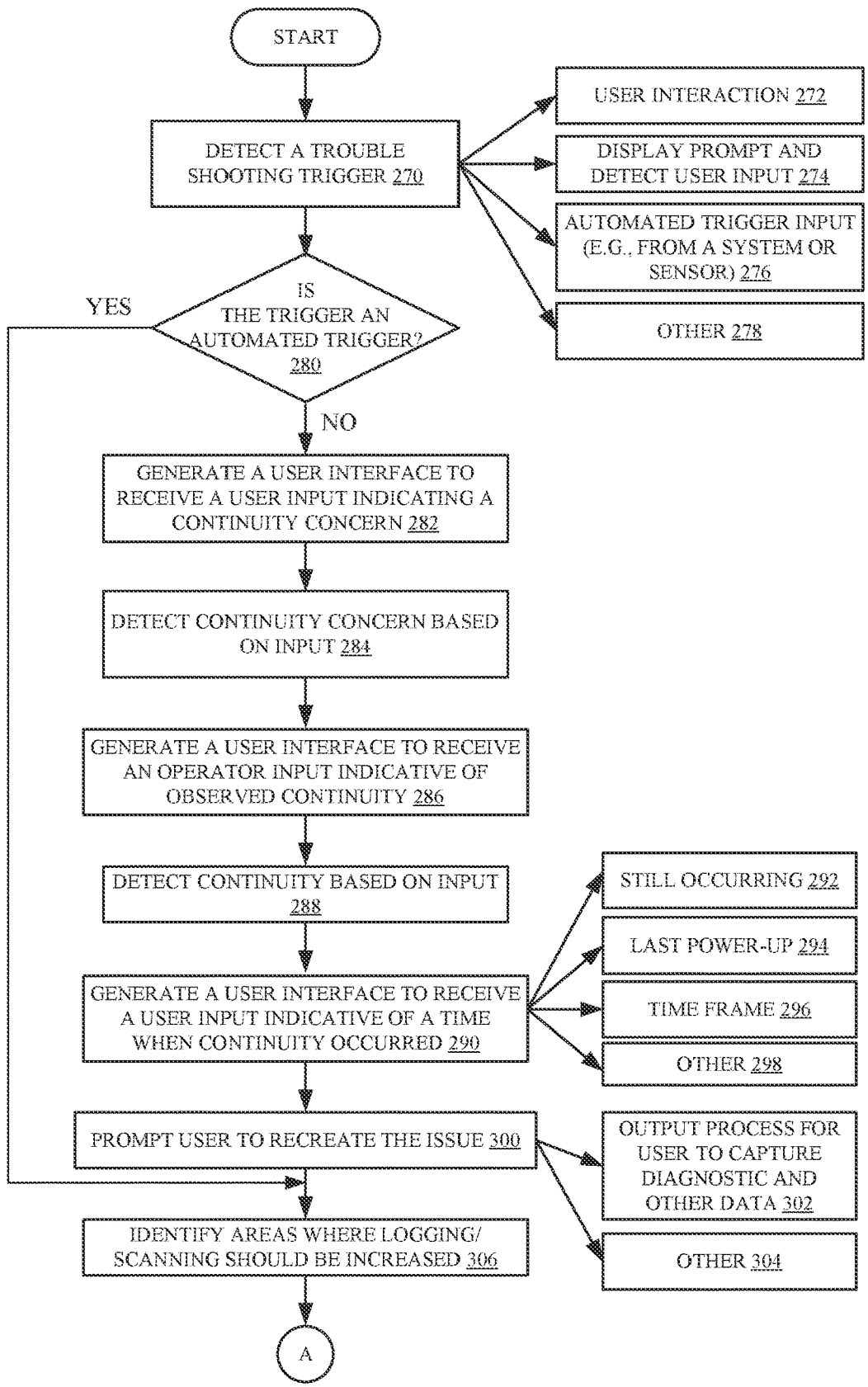
FIGS. 4A, 4B and 4C (collectively referred to herein as FIG. 4) show one example of a flow diagram illustrating how the location continuity database is generated and accessed and used in the context of establishing data continuity for an agricultural machine.
Figure 4B:
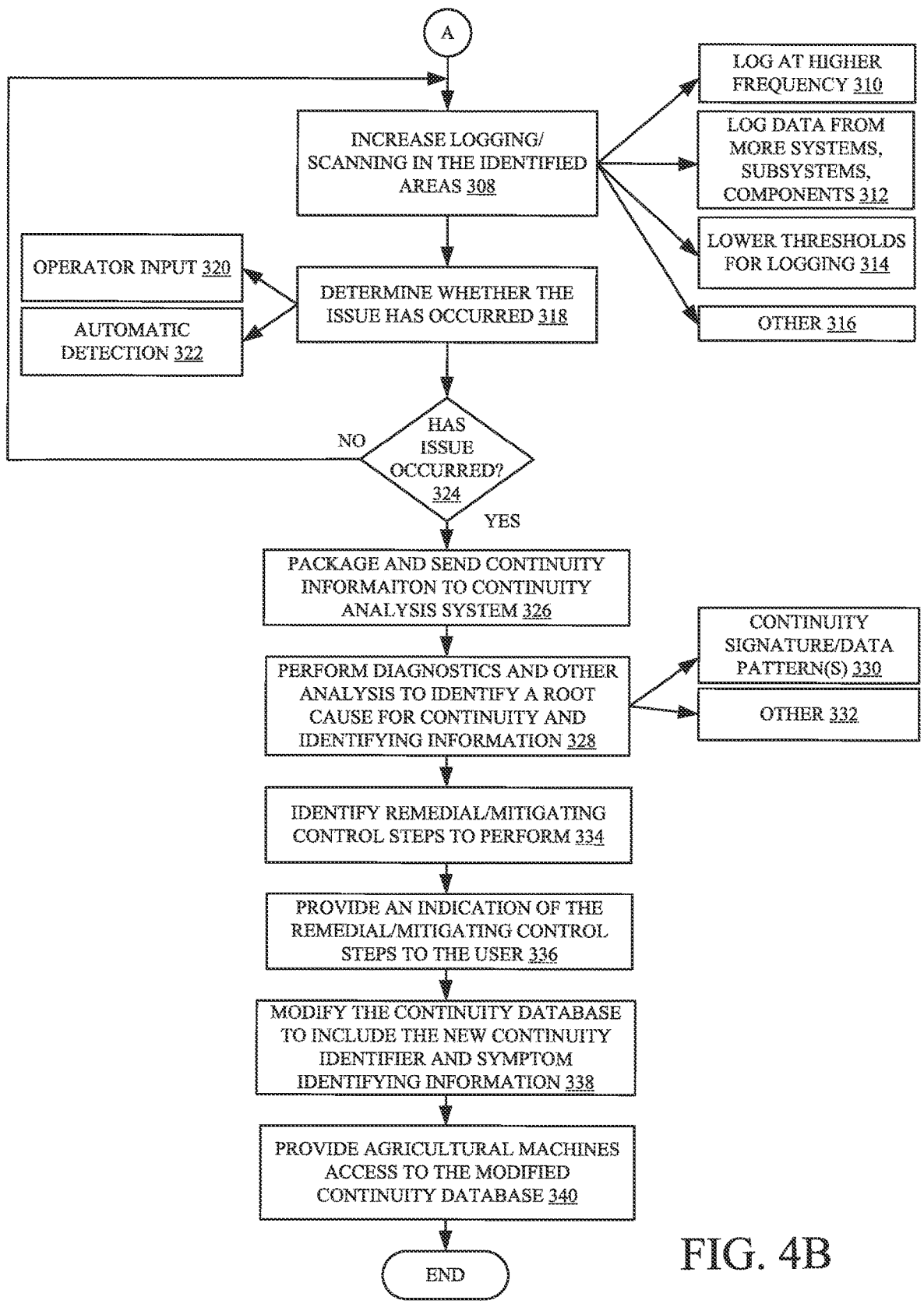
Figure 4C:
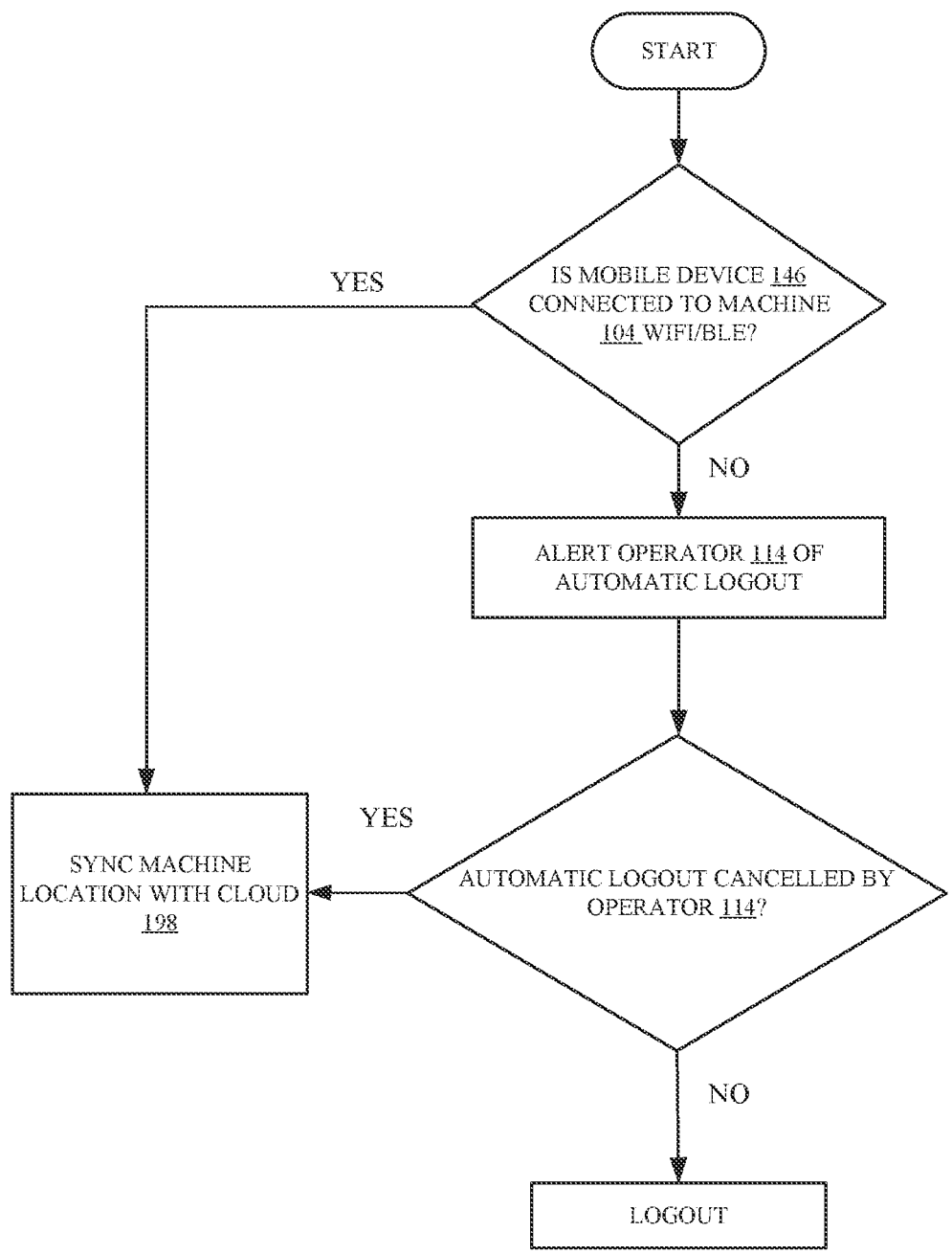

FIGS. 4A, 4B and 4C show a flow diagram illustrating performance of a troubleshooting operation when continuity identification system 184 is unable to identify a continuity/fault with mitigation control steps 196 in continuity database 136 for a set of scanned log data from data logs 132. At block 270, trigger detector 200 first detects a troubleshooting trigger indicating that troubleshooting system 138 should initiate a troubleshooting operation. In one example, trigger detector 200 detects an input from operator 114 initiating the troubleshooting operation, as indicated by block 272. For instance, the operator 114 may observe a fault and trigger the troubleshooting operation. In another example, continuity identification system 134 generates a prompt on operator interface mechanism 148 requesting that operator 114 initiate a troubleshooting operation, as indicated by block 274. In another example, any of the systems 142, subsystems 144, or sensors on agricultural machine 104 may generate an output automatically triggering a troubleshooting operation in troubleshooting system 138, as indicated by block 276. The trigger to perform a troubleshooting operation can be detected in other ways as well, as indicated by block 278.

If the trigger detector 200 detects a trigger based on an operator input from operator 114, as indicated by block 280, then user interface controller 202 controls an operator interface mechanism 148 to generate prompts to obtain additional information from operator 114. For instance, continuity identifier 212 can conduct a user interaction, prompting operator 114 for information to identify the continuity concern with one or more of the agricultural machine 104, operator 114 and/or mobile device 146. Generating an interface to receive a user input indicating the functional area of concern is indicated by block 282. Continuity identifier 212 then detects the operator input to identify the continuity concern to operator 114. Detecting the continuity concern is indicated by block 284.

Symptom identifier 214 may also control operator interface mechanisms 148 to generate prompts to obtain an operator input indicative of observed continuity/fault, as indicated by block 286. Symptom identifier 214 then detects the operator input to identify the continuity/fault. Detecting the continuity/fault can be done by receiving a textual input from operator 114, by receiving a selection input (such as from a drop down menu or other selectable operator input mechanism) or in other ways.

Symptom identifier 214 may also generate prompts allowing the operator 114 to identify when the continuity/fault occurred, as indicated by block 290. For instance, operator 114 may provide an input indicating that the continuity/fault are still occurring as indicated by block 292. Operator 114 may provide an input indicating that the symptoms occurred during the last shut down or operator swap of agricultural machine 104 as indicated by block 294. Operator 114 may provide an input indicating a specified time frame or a specified period during the agricultural operation when the continuity/fault occurred as indicated by block 296. Operator 114 may provide an input identifying the timing of when the continuity/fault occurred in other ways as well, as indicated by block 298.

It may also be that troubleshooting system 138 determines that, in order to best analyze the problem, operator 114 should attempt to recreate the problem so that accurate data can be captured by log generation system 130 or in other ways. Issue recreation identifier 216 can thus control operator interface mechanisms 148 to prompt operator 114 to recreate the issue or problem, as indicated by block 300. In one example, issue recreation identifier 216 outputs a process for operator 114 to follow in order to capture diagnostic and other data in order to better analyze the problem or issue. Outputting the process for the operator 114 to capture diagnostic and other data is indicated by block 302. Issue recreation identifier 216 can generate other outputs to control operator interface mechanism 148 to prompt operator 114 to recreate the issue in other ways as well, as indicated by block 304.

When the troubleshooting system is automatically triggered, or when operator 114 is attempting to recreate the continuity/fault, then log control system 204 identifies areas where logging or scanning should be increased, as indicated by block 306. For instance, where the suspected problem is a problem with one or more of the operator 114, the mobile device 146 or agricultural machine 104, then log control system 204 may control log generation system 130 and log scanning system 168 to increase the frequency with which data is logged from, for example, a mobile device or a set of mobile devices 146 and to increase the frequency with which that data is scanned for continuity tags or a continuity signature. Log control system 204 can identify the areas where logging and/or scanning should be increased in other ways as well.

Once the areas where logging and/or scanning are to be increased are identified, then log control system 204 controls log generation system 130 and log scanning system 168 to increase the logging and/or scanning in the identified areas, as indicated by block 308. For instance, as discussed above, log control system 204 can control log generation system 130 to increase the frequency with which data is captured and logged, as indicated by block 310. Log control system 204 may control log generation system 130 to preferentially increase the logging of data from certain systems 142, subsystems 144, and/or mobile device 146, as indicated by block 312. Log control system 204 can also control log generation system 130 to modify when log data is captured and stored. For instance, it may be that log generation system 130 is configured to log data from a specific sensor data when that specific sensor generates a sensor value that is above a particular threshold. In order to increase the amount of log data that is captured from the sensor, log control system 204 may lower the threshold for capturing and logging data, as indicated by block 314. This will increase the amount of data logged from the specific sensor. Increasing the logging or scanning of data can be done in a wide variety of other areas as well, as indicated by block 316.

Issue recreation identifier 216 can then determine whether the continuity/fault has been successfully recreated, as indicated by block 318. For instance, it may be that issue recreation identifier 216 generates an output on an operator interface mechanism 148 that allows operator 114 to manually indicate that the fault has been recreated, as indicated by block 320. Similarly, it may be that continuity identification system 134 can automatically identify that the fault has been detected, as indicated by block 322. If the fault has not been recreated, as indicated by block 324, then processing reverts to block 308 where the logging and scanning continues in an increased way. However, once the fault has occurred or been recreated, then data package generator 206 generates a data package that includes the various data logs 132, any outputs from continuity identification system 134 or other information that may be helpful in analyzing the data, and sends that package as continuity information 118 to continuity analysis system 102. Packaging and sending the continuity information to continuity analysis system 118 is indicated by block 326 in the flow diagram of FIG. 4B.

Continuity analysis system 102 then performs diagnostics and other analysis on the information in the particular data in the continuity information 118 that identifies the continuity/fault to identify a root cause. Performing diagnostics on the continuity information 118 to identify the fault that is occurring is indicated by block 328. The data in continuity information 118 that identifies the fault may be a continuity signature or other data pattern that is identified as being correlated to the fault, and thus being indicative that the fault is occurring. Identifying a continuity signature or data patterns is indicated by block 330. The diagnostics and analysis can be performed in other ways to identify the root cause and the corresponding system information identifying that continuity/fault (e.g., the continuity signature), as indicated by block 332.

Continuity analysis system 102 also identifies remedial or mitigating control steps that can be performed in order to address the continuity/fault, as indicated by block 334. The remedial or mitigating control steps can be provided back to operator 114, mobile device 146 or agricultural machine 104 through communication system 126 and displayed or otherwise output through operator interface mechanisms 148 to operator 114, as indicated by block 336. Continuity analysis system 102 can also modify the continuity database 136 to include the new continuity identifier and symptom identifying information (the continuity signature or data patterns) along with the mitigation control steps, as indicated by block 338. The modified continuity database can then be provided for access by agricultural machine 104, as indicated by block 340. The modified continuity database can be accessed via Cloud 198 or downloaded to agricultural machine 104 (as well as other agricultural machines) or continuity analysis system 102 can access the modified continuity database in other ways as well.

It can thus be seen that the present description describes a system in which continuity/faults from a plurality of different machines can be aggregated and analyzed and mitigation control steps for those faults can be generated in a continuity database. The continuity database can be intermittently updated and accessed on mobile devices or agricultural machines so that continuity issues can be readily identified, and errors mitigated before they occur on a machine.

With respect to FIG. 4C, a specific example is provided for mitigating a continuity/fault issue. In this example, an operator 114 fails to logout from a mobile application on their mobile device 146 following an agricultural operation. The operator 114 then leaves the cab of the machinery 104 with mobile device 146 creating a synchronization discontinuity. Specifically, due to single agricultural machines being assigned to multiple operators 114, the location of the agricultural machinery may be erroneous. In this example, continuity analysis system 102 may determine if the mobile device 146 is connected to the machinery 104 via WIFI, Bluetooth network, etc. If the mobile device 146 is connected and thus determined to be in proximity to the agricultural machinery 146, the location of the agricultural machinery 104 is synchronized with Cloud 198 and a correct live location of the agricultural machinery 104 created. If the mobile device 146 is not connected, continuity analysis system 102 will generate an automatic logout from the mobile application to ensure continuity of the live location of the agricultural machinery 104. In either event—whether by automatic or operator logout—only the correct data representative of the live location of the agricultural machine will be logged an synchronized with the Cloud 198.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
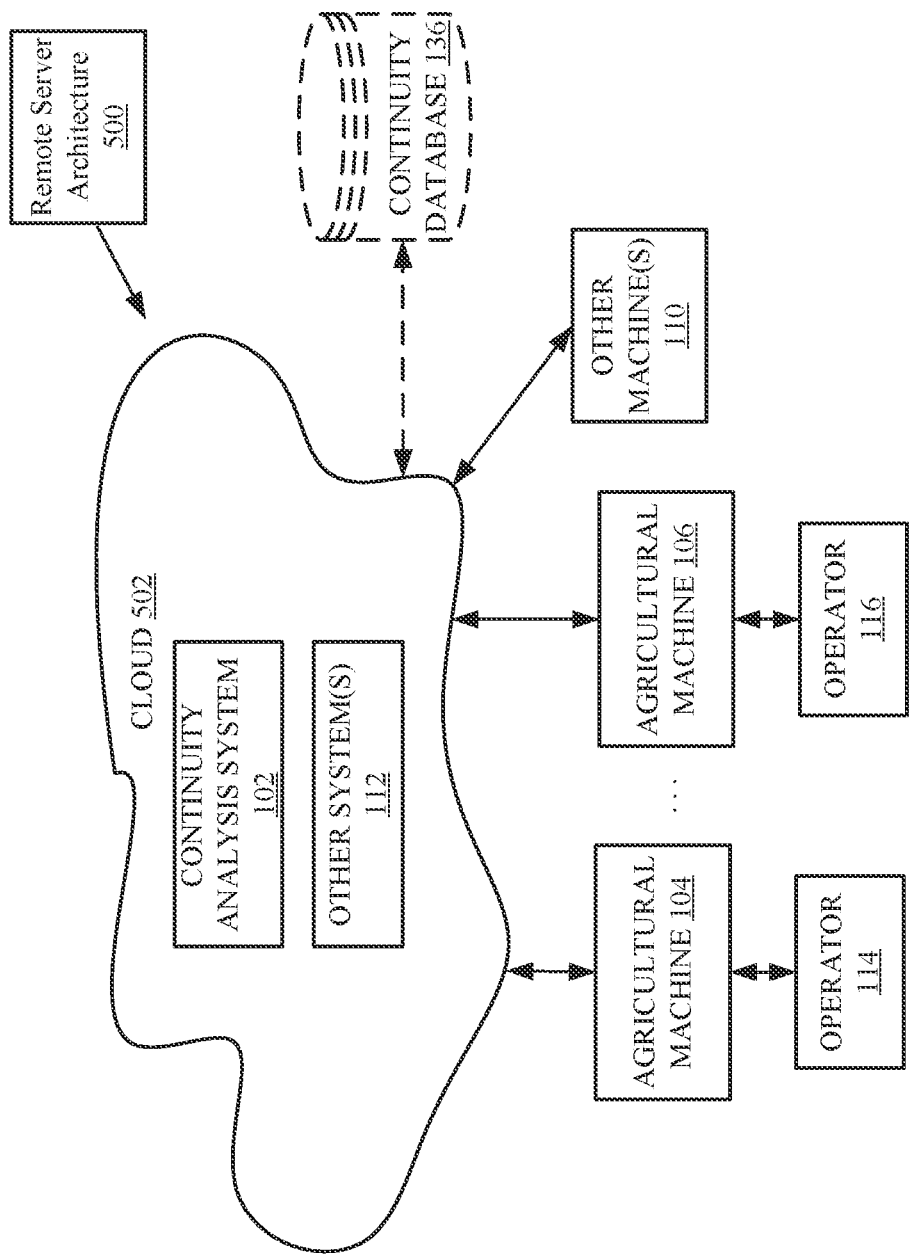
FIG. 5 is a block diagram showing one example of an agricultural system deployed in a remote server architecture.

FIG. 5 is a block diagram of agricultural system 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1-2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 5, some items are similar to those shown in FIGS. 1-2 and they are similarly numbered. FIG. 5 specifically shows that continuity analysis system 102 and other systems 112 can be located at a remote server location 502. Therefore, agricultural machines 104-106 and mobile devices 146 access those systems through remote server location 502.

FIG. 5 also depicts another example of a remote server architecture. FIG. 5 shows that it is also contemplated that some elements of FIGS. 1-2 are disposed at remote server location 502 while others are not. By way of example, continuity database 136 can be disposed at a location separate from location 502, and accessed through the remote server at location 502. Regardless of where they are located, they can be accessed directly by agricultural machines 104-106 and mobile devices 146, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck, pickup truck or tractor) can have an automated information collection system. As the agricultural machine 104 comes close to the fuel truck for fueling, the system automatically collects the information from the agricultural machine 104 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine 104 until the machine enters a covered location. The agricultural machine 104, itself, can then send the information to the main network.

It will also be noted that the elements of FIGS. 1-2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
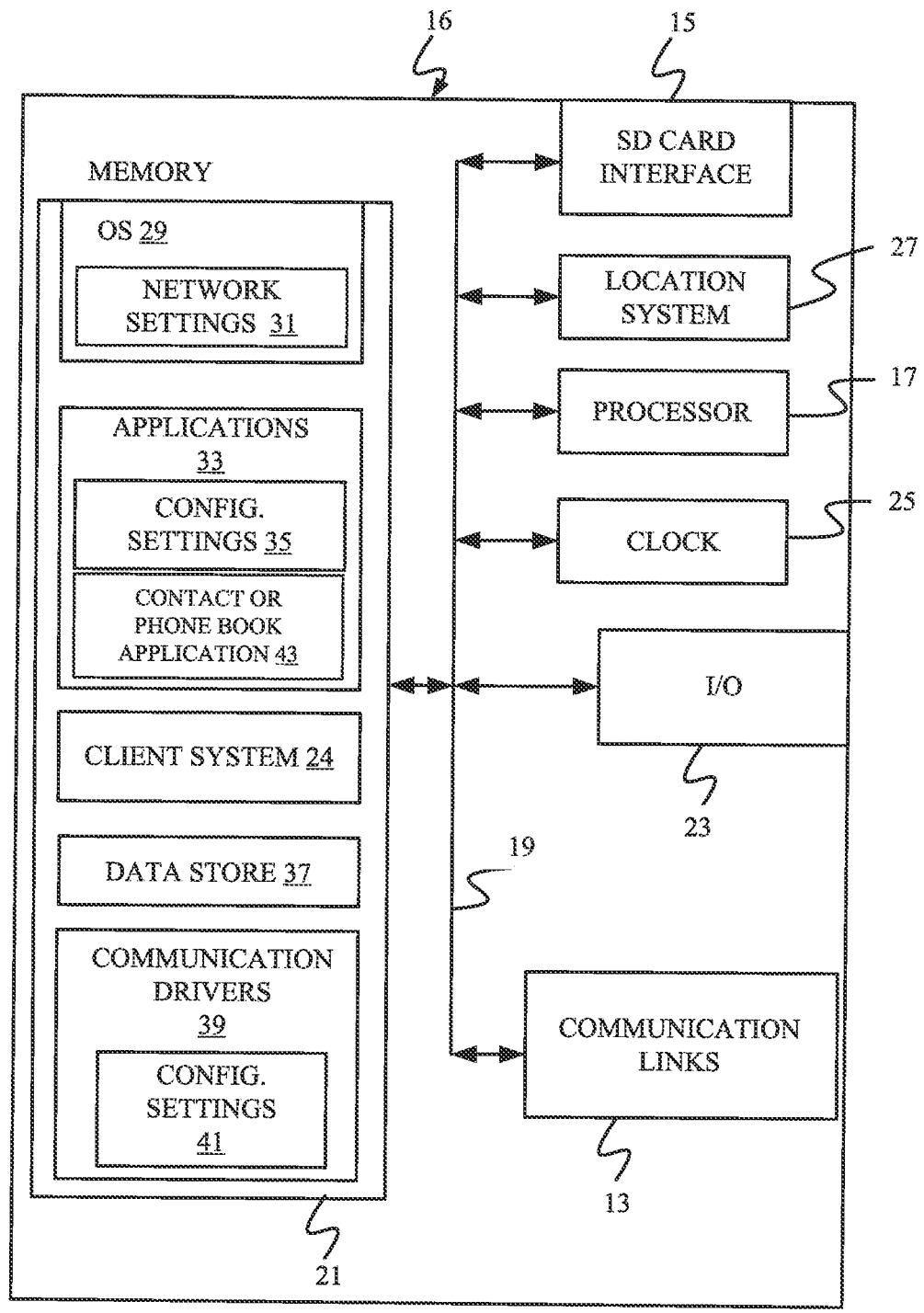
FIGS. 6, 7, and 8 show examples of mobile devices that can be used in various architectures.
Figure 7:
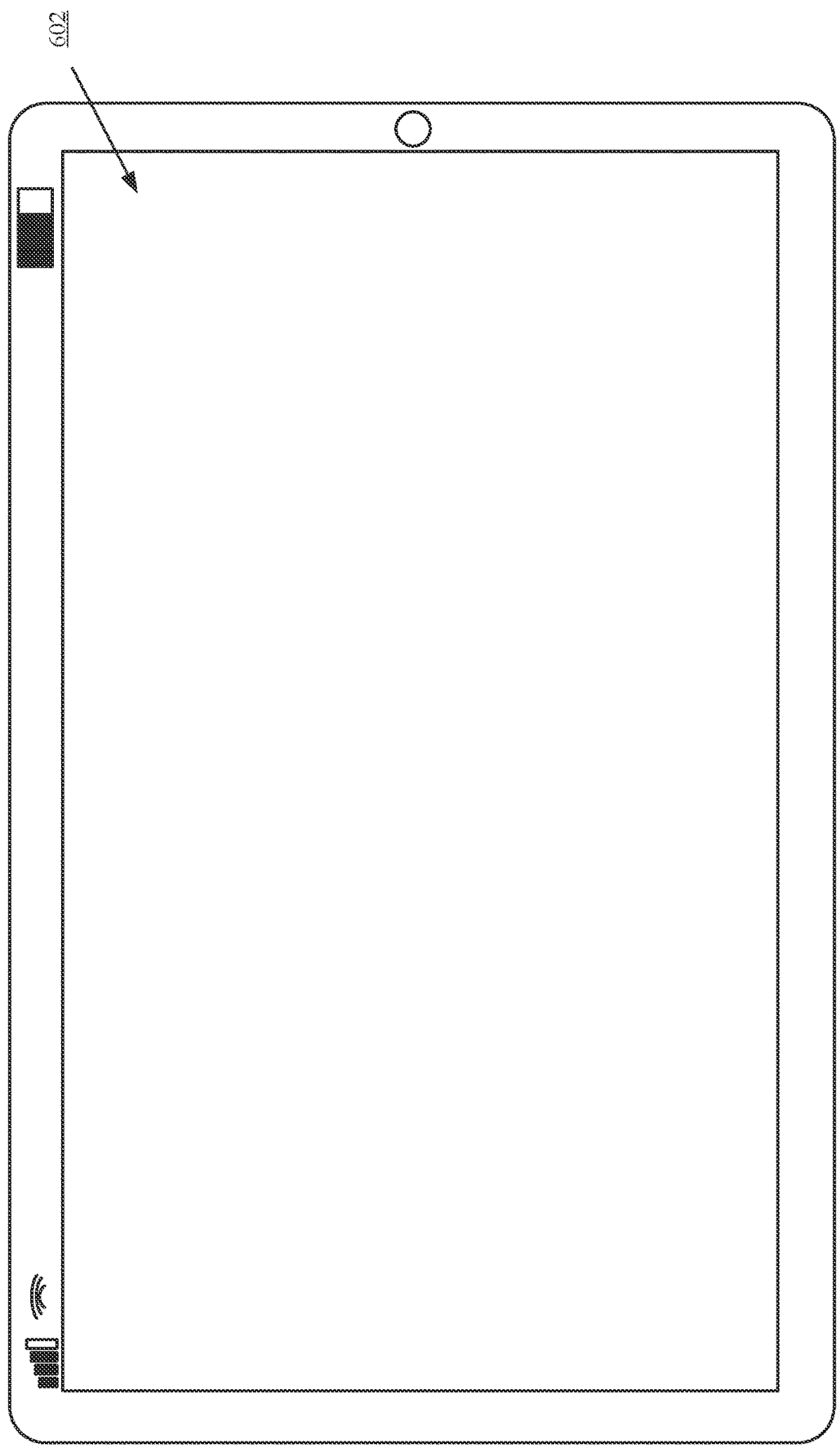
Figure 8:
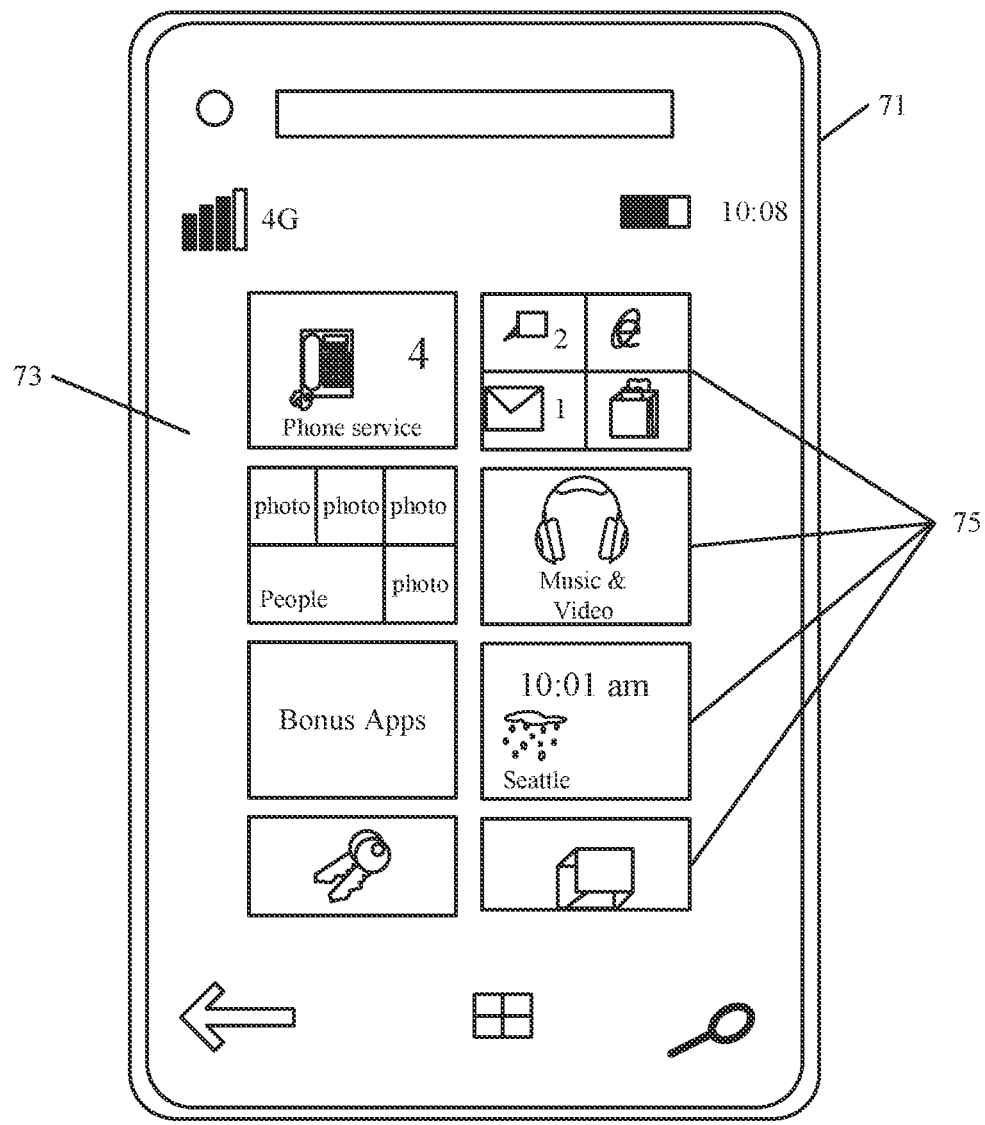
Figure 9:
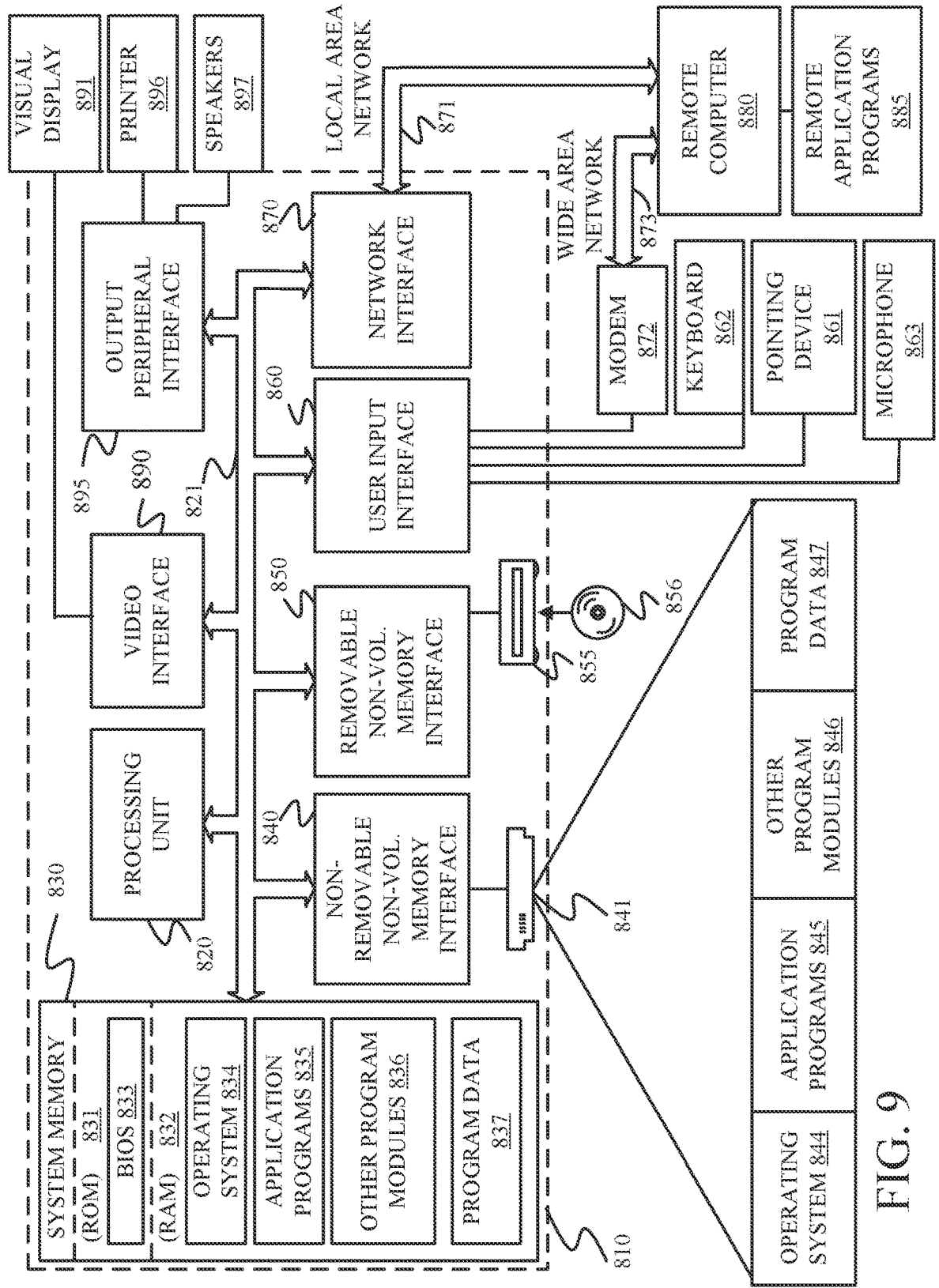
FIG. 9 is a block diagram of one example of a computing environment that can be used in various architectures.

FIG. 6 is a simplified block diagram of one illustrative embodiment of a handheld or mobile computing device that can be used as a user's or client's handheld device 16, in which the present system (or parts of it) can be deployed. For instance, a mobile device can be deployed in the operator compartment of agricultural machine 104 for use in generating, processing, or displaying the continuity data, mitigation control steps, etc. FIGS. 7-9 are examples of handheld or mobile devices.

FIG. 6 provides a general block diagram of the components of a client device 16 that can run some components shown in FIGS. 1-2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well. FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one embodiment of a computing environment in which elements of previous FIGS. or parts of it, (for example) can be deployed. With reference to FIG. 9, an example system for implementing some embodiments includes a computing device in the form of a computer 810 programmed to operate as discussed herein. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to mobile and static nodes (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static nodes, and the number and/or types of access to those nodes. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed access points, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system. The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication that utilizes agricultural machines as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of data from congested cellular networks.

In accordance with various aspects of the present disclosure, an affordable multi-network on-board unit is presented. Note that the on-board unit may also be referred to herein as a mobile access point, mobile access point, MAP, etc. The on-board unit may, for example, comprise a plurality of networking interfaces (e.g., Wi-Fi, 802.11p, 4G, Bluetooth, UWB, etc.). The on-board unit may, for example, be readily installed in or on agricultural machines (e.g., individual machines, fleets of machines, etc.). The on-board unit may, for example, be installed in or on a vehicle or other structure with free mobility or relatively limited mobility.

The on-board units may, for example, operate to connect agricultural machines to the wired infrastructure networks of one or more network providers, telecom operators, etc. In accordance with the architecture, hardware, and software functionality discussed herein, vehicles and fleets can be connected not just to the cellular and existing Wi-Fi hotspots spread over a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the on-board units and also fixed access points connected to the wired infrastructure (e.g., a local infrastructure, etc.). Note that on-board units herein may also be referred to as "mobile access points," "mobile hotspots," "MAPs," etc. Also note that fixed access points may also be referred to herein as road side units, fixed access points, FAPs, etc.

In an example implementation, the on-board units may communicate with the fixed access points utilizing a relatively long-range protocol (e.g., 802.11p, etc.), and the fixed access points may, in turn, be hard wired to the wired infrastructure (e.g., via cable, tethered optical link, etc.). Note that fixed access points may also, or alternatively, be coupled to the infrastructure via wireless link (e.g., 802.11p, etc.). Additionally, clients or user devices may communicate with the on-board units using one or more relatively short-range protocols (e.g., Wi-Fi, Bluetooth, UWB, etc.). The on-board units, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer on-board units are necessary to provide blanket coverage over a geographical area.

The on-board unit may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with fixed access points, vehicles, and other nodes in the network, the on-board unit may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the on-board unit may operate to provide in-vehicle Wi-Fi Internet access to users in and/or around the agricultural machine. The on-board unit may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a fixed access point, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An on-board unit, in accordance with various aspects of the present disclosure, may for example comprise a smart connection manager that can select the best available wireless link(s) (e.g., Wi-Fi, 802.11p, cellular, vehicle mesh, etc.) with which to access the Internet. The on-board unit may also, for example, provide geo-location capabilities (e.g., GPS, etc.), motion detection or vision sensors to determine if the vehicle is in motion, and a power control subsystem (e.g., to ensure that the on-board unit does not deplete the vehicle battery, etc.). The on-board unit may, for example, comprise any or all of the sensors (e.g., operational and environmental, etc.) discussed herein. The on-board unit may also, for example, comprise a manager that manages machine-to-machine data acquisition and transfer (e.g., in a real-time or delay-tolerant fashion) to and from the cloud. For example, the on-board unit may log and/or communicate information of the vehicles.

The on-board unit may, for example, comprise a connection and/or routing manager that operates to perform routing of communications in a vehicle-to-vehicle/vehicle-to-infrastructure multi-hop communication. A mobility manager may, for example, ensure that communication sessions persist over one or more handoff(s) (also referred to herein as a "handover" or "handovers") (e.g., between different mobile access points, fixed access points, base stations, hot spots, etc.), among different technologies (e.g., 802.11p, cellular, Wi-Fi, satellite, etc.), among different mobility managers (e.g., in a fail-over scenario, load redistribution scenario, etc.), across different interfaces (or ports), etc. Note that the mobility manager may also be referred to herein as a local mobility anchor, a network controller, etc. Note that the mobility manager, or a plurality thereof, may for example be implemented as part of the backbone, but may also, or alternatively, be implemented as part of any of a variety of components or combinations thereof. For example, the mobility manager may be implemented in a fixed access point (or distributed system thereof), as part of an on-board unit (or a distributed system thereof), etc.

Various aspects of the present disclosure also provide a cloud-based service-oriented architecture that handles the real-time management, monitoring and reporting of the network and clients, the functionalities required for data storage, processing and management, the Wi-Fi client authentication and captive portal display, etc.

For example, an example implementation may operate to turn one or more agricultural machines into a mobile access point (e.g., a mobile Wi-Fi hotspot), offering Internet access to operators, farm managers, etc. Moreover, through an example vehicular mesh network formed between vehicles and/or fleets of vehicles, an implementation may be operable to offload cellular traffic through the mobile Wi-Fi hotspots and/or fixed access points (e.g., 802.11p-based access points) to ensure the widest possible coverage at the lowest possible cost.

Depending on the use case, the on-board unit may for example process (or compute, transform, manipulate, aggregate, summarize, etc.) the data before sending the data from the vehicle, for example providing the appropriate granularity (e.g., value resolution) and sampling rates (e.g., temporal resolution) for each individual application. For example, the on-board unit may, for example, process the data in any manner deemed advantageous by the system. The on-board unit may, for example, send the collected data (e.g., raw data, preprocessed data, information of metrics calculated based on the collected data, etc.) to the Cloud (e.g., to one or more networked servers coupled to any portion of the network) in an efficient and reliable manner.

An on-board unit may, for example, be operable to communicate with any of a variety of Wi-Fi-enabled sensor devices equipped with a heterogeneous collection of environmental sensors on or associated with one more agricultural machines. Such sensors may, for example, comprise noise sensors, gas sensors (e.g., sensing CO, NO2, O3, volatile organic compounds (or VOCs), CO2, etc.), smoke sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., agricultural machine operators or passengers, etc.) and/or their personal devices (e.g., smart phones or watches, biometrics sensors, wearable sensors, implanted sensors, etc.). Such sensors may, for example, comprise sensors and/or systems associated with on-board diagnostic units for vehicles. Such sensors may, for example, comprise positioning sensors (e.g., GPS sensors, Galileo sensors, GLONASS sensors, etc.).

Once an agricultural machine enters the vicinity of such a sensor device, a wireless link may be established, so that the vehicles (or on-board unit thereof) can collect sensor data from the sensor device and upload the collected data to a database in the Cloud (e.g., via a mesh network). Note that various sensors may always be in range of the mobile access point (e.g., vehicle-mounted sensors). Note that the sensor may also (or alternatively) be mobile (e.g., a sensor mounted to other vehicles passing by a mobile access point or fixed access point, a drone-mounted sensor, operator-mounted sensor, etc.).

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
   an agricultural machine having a communication network;
   a continuity identification system configured to generate continuity data, the continuity data relating to an operator and a mobile device on the communication network of the agricultural machine and an identification of a fault in the continuity data based on a comparison of the continuity data to a logged data;
   and a control signal generator that generates a control signal based on the identification of the fault, the control signal configured to automatically logout the operator from an application on the mobile device when the mobile device is no longer connected to the communication network.

2. The agricultural system of claim 1, further comprising a log generation system that generates a set of data logs logging the mobile device on the communication network.

3. The agricultural system of claim 2, wherein the continuity identification system comprises:
a continuity signature identifier configured to identify a data pattern in the data logs; and
a continuity identifier configured to compare the identified data pattern to the continuity identifying information.

4. The agricultural system of claim 1, wherein the control signal includes a prompt to the operator to perform a mitigation control step corresponding to a continuity identified by the continuity identification system.

5. The agricultural system of claim 3, wherein the continuity identification system comprises:
a mitigation control step identifier configured to identify the mitigation control step corresponding to the identified continuity, wherein the control signal generator generates the control signal to execute the mitigation control step.

6. A method of controlling an agricultural system, the method comprising:
providing an agricultural machine having a communication network;
associating an operator and a mobile device on the communication network of the agricultural machine;
sensing a connection of the mobile device to the communication network;
determining whether the mobile device is connected to the agricultural machine;
in response to a determination that the mobile device is not connected to the agricultural machine, generating a control signal to automatically logout the operator from an application on the mobile device; and
in response to a determination that the mobile device is connected to the agricultural machine, determining a location of the agricultural machine relative to the mobile device.

7. An agricultural system, comprising:
a communication system configured to receive a first set of continuity information from a first agricultural machine and a second set of continuity information from a second agricultural machine;
a continuity information processing system that generates a first continuity data record identifying a first continuity corresponding to the first set of continuity information and that generates a second continuity data record identifying a second continuity corresponding to the second set of continuity information and an identification of a fault in the continuity data based on a comparison of the continuity data to a logged data;
and a continuity database generation system that generates a continuity database that includes the first continuity data record and the second continuity data record, the communication system sending the continuity database to the first agricultural machine and the second agricultural machine.

8. The agricultural system of claim 7, wherein the communication system is configured to receive a subsequent set of continuity information from the first agricultural machine, and wherein the continuity information processing system is configured to generate a subsequent continuity data record identifying a subsequent continuity corresponding to the subsequent set of continuity information.

9. The agricultural system of claim 7, wherein the continuity database generation system is configured to generate a modified continuity database that includes the subsequent continuity data record and wherein the communication system is configured to send the modified continuity database to the first agricultural machine and the second agricultural machine.

10. The method of claim 6, wherein before generating a control signal to automatically logout an operator from an application on the mobile device, further including:
providing an input to the agricultural machine to send continuity information to a continuity analysis system; or
sending continuity information to a continuity analysis system in response to a determination that the mobile device is not connected to the agricultural machine.

11. The method of claim 6, wherein the determination of the location of the agricultural machine relative to the mobile device results in a determination of a current location of the agricultural machine.

12. The method of claim 11, further including storing the current location of the agricultural machine in a continuity database.

13. The method of claim 6, further including, in response to a determination that the mobile device is not connected to the agricultural machine, modifying a technique of data collection by the agricultural machine and the mobile device.

14. The method of claim 13, wherein modifying the technique of data collection includes at least one of increasing a frequency of data collection, decreasing the frequency of data collection, or changing a type of data collected.

15. The agricultural system of claim 7, wherein the continuity information processing system is configured to identify a mitigation control operation, the mitigation control operation is to mitigate at least one of the first continuity or the second continuity.

16. The agricultural system of claim 15, wherein the continuity database further includes the mitigation control operation, the continuity database to match the mitigation control operation to at least one of the first continuity or the second continuity.

17. The agricultural system of claim 7, wherein a continuity identification system is configured to scan collected data for a third continuity, the identification of the third continuity based on a comparison of the continuity database with a third continuity data record.

18. The agricultural system of claim 17, wherein, upon identification of the third continuity, a mitigation operation system identifies a mitigation operation based on the identity of the third continuity.

19. The agricultural system of claim 18, further including a troubleshooting system to determine the mitigation operation in response to a determination that the third continuity is not identifiable by the continuity identification system or in response to a user input.

20. The agricultural system of claim 19, wherein a log control system identifies an area to increase a frequency of data collection.

* * * * *

UNITED STATES PATENT AND TRADEMARK OFFICE
CERTIFICATE OF CORRECTION

| | | |
|---|---|---|
| PATENT NO. | : 11,991,248 B1 | Page 1 of 1 |
| APPLICATION NO. | : 18/053797 | |
| DATED | : May 21, 2024 | |
| INVENTOR(S) | : Hannure et al. | |

It is certified that error appears in the above-identified patent and that said Letters Patent is hereby corrected as shown below:

In the Claims

Column 22, Claim 1, Line 64, Delete "data;" and insert -- data; and --

Column 22, Claim 1, Line 65, Delete "and"

Column 23, Claim 7, Line 54, Delete "data;" and insert -- data; and --

Column 23, Claim 7, Line 55, Delete "and"

Signed and Sealed this
Eighteenth Day of June, 2024

*Katherine Kelly Vidal*

Katherine Kelly Vidal
*Director of the United States Patent and Trademark Office*